US006656040B1

(12) United States Patent
Brosnan et al.

(10) Patent No.: US 6,656,040 B1
(45) **Date of Patent: *Dec. 2, 2003**

(54) PARALLEL GAMES ON A GAMING DEVICE

(75) Inventors: William J. Brosnan, Reno, NV (US); Dwayne Nelson, Las Vegas, NV (US); Steven G. Lemay, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,437

(22) Filed: Apr. 19, 2000

(51) Int. Cl.[7] .............................................. G06F 17/00

(52) U.S. Cl. ............................ 463/16; 463/25; 463/17; 463/18; 463/19; 463/20; 273/121 B

(58) Field of Search ............................. 463/20, 19, 16; 273/121 B

(56) References Cited

U.S. PATENT DOCUMENTS

| | | | | |
|---|---|---|---|---|
| 2,671,662 A | * | 3/1954 | Carpenter et al. | 104/140 |
| 4,805,907 A | * | 2/1989 | Hagiwara | 463/20 |
| 4,856,787 A | * | 8/1989 | Itkis | 273/237 |
| 5,131,655 A | | 7/1992 | Ugawa | 273/121 B |
| 5,242,163 A | | 9/1993 | Fulton | 273/85 |
| 5,393,057 A | * | 2/1995 | Marnell, II | 273/269 |
| 5,509,655 A | | 4/1996 | Ugawa | 273/121 B |
| 5,664,998 A | * | 9/1997 | Seelig et al. | 273/143 R |
| 5,722,891 A | | 3/1998 | Inoue | 463/20 |
| 5,725,210 A | | 3/1998 | Yamaguchi et al. | 273/121 B |
| 5,762,552 A | | 6/1998 | Vuong et al. | 463/25 |
| 5,836,819 A | * | 11/1998 | Ugawa | 273/121 B |
| 6,029,973 A | | 2/2000 | Takemoto | 273/121 B |
| 6,047,963 A | | 4/2000 | Pierce et al. | 273/121 B |
| 6,117,009 A | * | 9/2000 | Yoseloff | 273/138.1 |
| 6,131,909 A | | 10/2000 | Chilese | 273/292 |
| 6,139,013 A | | 10/2000 | Pierce et al. | 273/121 B |
| 6,159,095 A | * | 12/2000 | Frohm et al. | 463/19 |
| 6,203,009 B1 | | 3/2001 | Sines et al. | 273/121 B |
| 6,203,428 B1 | * | 3/2001 | Giobbi et al. | 463/16 |
| 6,210,275 B1 | * | 4/2001 | Olsen | 273/138.1 |
| 6,213,875 B1 | | 4/2001 | Suzuki | 463/20 |
| 6,213,877 B1 | * | 4/2001 | Walker et al. | 463/22 |
| 6,220,593 B1 | * | 4/2001 | Pierce et al. | 273/121 B |
| 6,309,299 B1 | * | 10/2001 | Weiss | 273/108.1 |
| 6,340,158 B2 | | 1/2002 | Pierce et al. | |
| 6,398,645 B1 | * | 6/2002 | Yoseloff | 463/19 |

FOREIGN PATENT DOCUMENTS

| | | | | |
|---|---|---|---|---|
| DE | 3738121 A1 | | 5/1989 | G07F/17/32 |
| DE | 42 32 762 A1 | | 3/1994 | G07F/17/34 |
| EP | 0 930 589 A1 | | 7/1999 | G07F/17/32 |
| GB | 2239547 A | * | 7/1991 | G07F/17/34 |
| GB | 2 327 794 A | | 2/1999 | G07F/17/34 |

OTHER PUBLICATIONS

Elman et al., Microsoft Windows 3.1, Step by Step, 1992, Microsoft Press, 22–23.*

* cited by examiner

*Primary Examiner*—Derris H. Banks
*Assistant Examiner*—Corbett B Coburn
(74) *Attorney, Agent, or Firm*—Beyer Weaver Thomas LLP

(57) ABSTRACT

A gaming machine displays multiple game outcome presentations to one or more players playing the gaming machine. A player may initiate a new game on the gaming machine while the outcome of a previous game is being presented to the player. For a number of different games, two or more game outcomes may be presented simultaneously to the player on the gaming machine. The game outcome presentations for two or more of the games may appear to interact. However, the game outcomes determined by the gaming machine are independent of one another and do not depend on the game outcome presentation. Many different combinations of games may be played simultaneously on the gaming machine.

42 Claims, 8 Drawing Sheets

PARALLEL GAMES ON A GAMING DEVICE

BACKGROUND OF THE INVENTION

This invention relates to game playing methods for gaming machines such as video slot machines and video poker machines. More particularly, the present invention relates to methods of allowing game players to play multiple games in parallel on a video gaming machine.

There are a wide variety of devices that can comprise a gaming machine such as a slot machine or video poker machine. Some examples of these devices are lights, slot reels, ticket printers, card readers, speakers, bill validators, coin acceptors, display panels, key pads, bonus wheels, and button pads. These devices provide many of the features which allow a gaming machine to present a game. Some of these devices are built into the gaming machine. Often, a number of devices are grouped together in a separate box that is placed on top of the gaming machine. Devices of this type are commonly called a top box.

Typically, utilizing a master gaming controller, the gaming machine controls various combinations of devices that allow a player to a play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to operate input devices including bill validators and coin acceptors to accept money into the gaming machine and recognize user inputs from devices including key pads and button pads to determine the wager amount and initiate game play.

After a game has been initiated on the gaming machine, the gaming machine determines a game outcome and presents the outcome of the game to a player. For example, for a slot game, after a player has initiated a game by pressing an input button or pulling a handle attached to the gaming machine, the gaming machine determines a game outcome which is the final position of each reel on the slot machine. Then, the outcome of the slot game is presented to the player. For some slot games, the game outcome presentation is initiated before the game outcome is determined. For example, the final position of the reels may be determined after the reels have begun to spin. The game outcome presentation might include a number reels spinning, visual effects including flashing or strobing lights and auditory effects including bells and whistles. The game outcome presentation, including the various visual and auditory effects, is designed to add excitement to the game being played on the gaming machine and encourage additional game play.

Typically, the game outcome determined by the gaming machine is presented toward the end of the game outcome presentation. For example, for the slot game, the game outcome determined by the slot machine is the final position of each of the reels. Based on the game outcome, the gaming machine may notify the player of an award of a varying amount or notify the player that the wager made on the game was lost. For example, for a slot game with three slot reels, when the final position of each reel corresponds to the display of an identical symbol including three cherries, three bars or the like, a player might be awarded a credit of 5 times the initial wager made on the game. However, other symbol combinations including 2 cherries and a bar or two bars and a cherry might result in a loss of the wager made on the game. After the game outcome has been presented, a player may initiate a new game by making a new wager on the gaming machine and initiating the next game play.

Traditionally, game play on a gaming machine such as a slot machine or a video poker machine is presented sequentially. For example, for a slot game after a player has deposited money or indicia of credit into the gaming machine, a player makes a wager and initiates a game play. Then, the gaming machine determines a game outcome and presents the game outcome. A player is not able to make a new wager and initiate another game on the gaming machine until the presentation of the outcome of the previous game is complete.

On some a gaming machines, a game player is able to make multiple bets on a single game outcome presentation. For example, some slot games allow a player to make wagers on multiple paylines. For a slot game with three reels, a payline is a line that relates combinations of symbols displayed on each reel. In this example, the game play and presentation are still sequential. A player makes one or more bets and initiates the game play. Then, the gaming machine determines and presents the game outcome while accounting for the possible multiple awards afforded by the multiple paylines. However, a player is not able to make one or more new wagers and initiate another game on the gaming machine until the presentation of the outcome of the previous game is complete.

In another example, some conventional slot machines have been made with three sets of three slot reels for a total of nine reels. In these games, a player may make one or more wagers on paylines that relate combinations of three symbols displayed on three different reels. For example, when the reels are arranged in three rows of three reels each, a player might make wagers on three paylines that span each row of the three slot reels. After making the wagers, a player initiates a game play. Then, the gaming machine calculates a game outcome which is the position of each of the nine reels and presents the game outcome while accounting for the possible multiple awards afforded by the multiple paylines. For this gaming machine, the game play is still sequential because a player is not able to make one or more new wagers and initiate another game on the gaming machine until the presentation of the outcome of the previous game is complete. Other sequential games that may provide wagering and game play in this manner include a 4 card keno game and a bingo game.

In another example, some conventional slot machines have been made with a bonus game capability. In these slot games, some game outcomes activate a bonus game feature. For example, a bonus game feature might comprise a tabular grid marked with various prizes. When the bonus game feature is activated, one of the grid locations may be randomly selected by the gaming machine as a bonus game outcome and the player may win an additional award corresponding to the prize displayed at the grid location. For gaming machine with bonus game features, the game play is still sequential because a player is not able to make another wager or initiate another game on the gaming machine until both the presentation of the game outcome and the presentation of the bonus game are complete.

A disadvantage of the current method for offering prizes and pay-outs on a gaming machine is that the sequential game play limits the gaming throughput. On a gaming machine, the gaming throughput is the maximum number of games that can be played on the gaming machine in a fixed period of time. The length of a game may be defined as the sequence of a player making a bet and initiating a game play and the gaming machine determining and presenting a game outcome. For example, on a slot machine, this game sequence usually requires about 3–5 seconds. Thus, in this example, the gaming throughput for this machine is about 0.2 to 0.3 games/second.

The profitability of a gaming machine is usually related to the product of the gaming throughput and the average wager per game. Typically, casino operators prefer gaming machines with a high profitability because the house share or drop is a percentage of the wagers made on the gaming machine. As described above for a slot machine, the average wager per game may be increased by offering multiple wagering opportunities such as multiple paylines. This game playing methodology may increase the average wager per game. However, it may also decrease the gaming throughput because of the time needed to make multiple wagers.

Typically, for most games played on a gaming machine, the majority of time in a game sequence is consumed by the game outcome presentation. For example, for a slot game, the game outcome presentation involves the slot reels spinning and stopping at a final position. Typically, the length of the game outcome presentation is made as short as possible to increase the game throughput. However, when the game outcome presentation becomes too short a player may lose interest in the game. Thus, for sequential game play on a gaming machine, the gaming throughput is usually limited by the presentation of the game outcome. Accordingly, it would be desirable to provide a game playing methodology for a gaming machine which overcomes the limitations of sequential game outcome presentations and increases the gaming throughput of a gaming machine.

SUMMARY OF THE INVENTION

This invention addresses the needs indicated above by providing a gaming machine which displays multiple game outcome presentations simultaneously to one or more players playing the gaming machine. A player may initiate a new game on the gaming machine while the outcome of a previous game is being presented to the player. For a number of different games, two or more game outcomes may be presented simultaneously to the player on the gaming machine. The game outcome presentations for two or more of the games may appear to interact. However, the game outcomes determined by the gaming machine are typically independent of one another and do not depend on the game outcome presentation. Many different combinations of games may be played simultaneously on the gaming machine.

One aspect of the present invention provides a gaming machine that generally can be characterized as including (1) a master gaming controller that determines game outcomes and controls the game outcome presentations for one or more games in a manner allowing simultaneous game outcome presentations for two or more separate game sequences and (2) a display screen that simultaneously displays the game outcome presentations for the two or more game sequences. A first game outcome presentation and a second game outcome presentation may appear to interact on the display screen where the display screen is selected from the group consisting of a video display screen, a video touch screen and LCD screen. Further, the game outcome presentation may include a bonus game.

In preferred embodiments, a first game in a first game sequence may be selected from the group consisting of consisting of balloons, pachinko, slot, keno, or poker and a second game in a second game sequence may be selected from the group consisting of balloons, pachinko, slot, keno, or poker. Further, the first and the second game may be the same. The game outcomes may determined by the master gaming controller from a pay table. Further, a first game outcome may be determined by the master gaming controller from a first pay table and a second game outcome may be determined by the master gaming controller from a second pay table where the game outcome of each game is not related to the game outcome of any other game.

In preferred embodiments, a first game may be initiated by a first player and a second game may be initiated by a second player different from the first player where the game outcome presentation from the first game is presented simultaneously with the game outcome presentation of the second game. The game outcome presentations from the first and second games may be presented on a shared display screen receiving signals from at least the gaming machine and one other gaming machine. Additionally, one or more game outcome presentations for one or more game sequences from the gaming machine may be displayed on the display screen of a second gaming machine. Also, a game event in the first game or a game event in the second game may trigger a bonus game for the first player and for the second player.

Another aspect of the present invention provides a method for playing multiple games on a gaming machine. The method may be characterized as including the following steps 1) receiving an input signal to start a first game, 2) determining a game outcome for the first game, 3) presenting the game outcome for the first game, 4) receiving an input signal to start a second game prior to completion of the game outcome presentation for the first game, 5) determining a game outcome for the second game, and 6) presenting the game outcome for the second game. When the first game outcome and the second game outcome are displayed simultaneously, the first game outcome presentation and the second game outcome presentation may appear to interact. Further, a bonus game associated with the first game may be presented prior to the completion of the game outcome presentation for the first game and the gaming machine may receive an input signal to start the bonus game, determine a bonus game outcome and present the bonus game outcome.

In preferred embodiments, the first game may be selected from the group consisting of balloons, pachinko, slot, keno, and poker and the second game may selected from the group consisting of balloons, pachinko, slot, and keno, poker where the first game and the second game may be the same. The game outcome of the first game may be determined from a first pay table and the game outcome of the second game may be determined from a second pay table where the first pay table and the second pay table may be the same. Also, a first wager may be made on the first game which may be different from a second wager made on the second game.

Another aspect of the present invention provides a parallel game on a gaming machine. The parallel game may be characterized as including 1) a first game that can be separately initiated and presented on a first portion of a display screen and 2) a second game that can be separately initiated and presented on a second portion of a display screen. The first game and the second game may be the same and may be selected from the group consisting of balloons, pachinko game, slot games, poker games, and keno games. Further, when the first and second game are the same game and are selected from the group consisting of balloons and pachinko, the first portion of the display screen and the second portion of the display screen may be the same portion.

These and other features of the present invention will be presented in more detail in the following detailed description of the invention and the associated figures.

DESCRIPTION OF THE PREFERRED EMBODIMENTS

Figure 1:
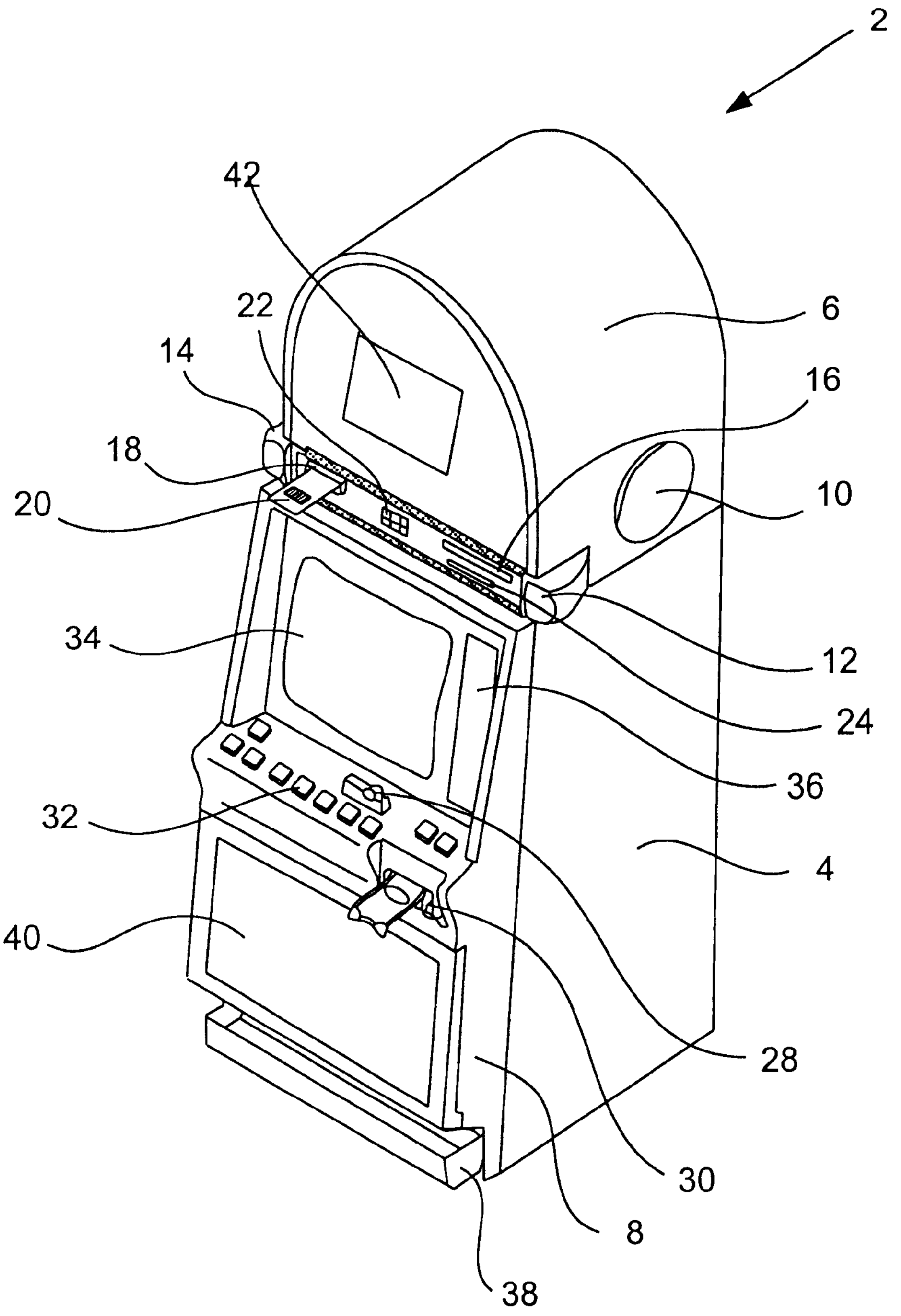
FIG. 1 is a perspective drawing of a gaming machine having a top box and other devices.

Turning first to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Typically, the main door 8 and/or any other portals which provide access to the interior of the machine utilize a locking mechanism of some sort as a security feature to limit access to the interior of the gaming machine. Attached to the main door are player-input switches or buttons 32, a coin acceptor 28, and a bill validator 30, a coin tray 38, a belly glass 40, and a monitor mask 42. Viewable through the main door is a video display monitor 34 and an information panel 36. The display monitor 34 will typically be a cathode ray tube, high resolution flat-panel LCD, or other conventional electronically controlled video monitor. Further, the video display monitor 34 may be a touch screen. The touch screen may respond to inputs made by a player touching certain portions of the screen. The information panel 36 is a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (not shown) housed inside the main cabinet 4 of the machine 2. Many possible games, including traditional slot games, video slot games, video poker, and keno may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a glass panel with display lamps 16, a ticket printer 18 which prints bar-coded tickets 20, a key pad 22 for entering player tracking information, a florescent display 24 for displaying player tracking information, a card reader 26 for entering a magnetic striped card containing player tracking information, and a video display screen 40. Further, the top box 6 may house different or additional devices than shown in the FIG. 1. For example, the top box may contain a bonus wheel or a back-lit silk screened panel which may be used to add bonus features to the game being played on the gaming machine. During a game, these devices are controlled, in part, by circuitry (not shown) housed within the main cabinet 4 of the machine 2. The top box 6 is designed to be removable from the machine 2. Typically, the top box 6 is replaced to repair a device within the top box 6 or to install a new top box 6 with a different set of devices.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 1, when a user wishes to play the gaming machine 2, he or she inserts cash through the coin acceptor 28 or bill validator 30. At the start of the game, the player may enter playing tracking information using the card reader 26, the keypad 22, and the florescent display 26. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary their wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 including lights behind the front glass 16 on the top box 6 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2:
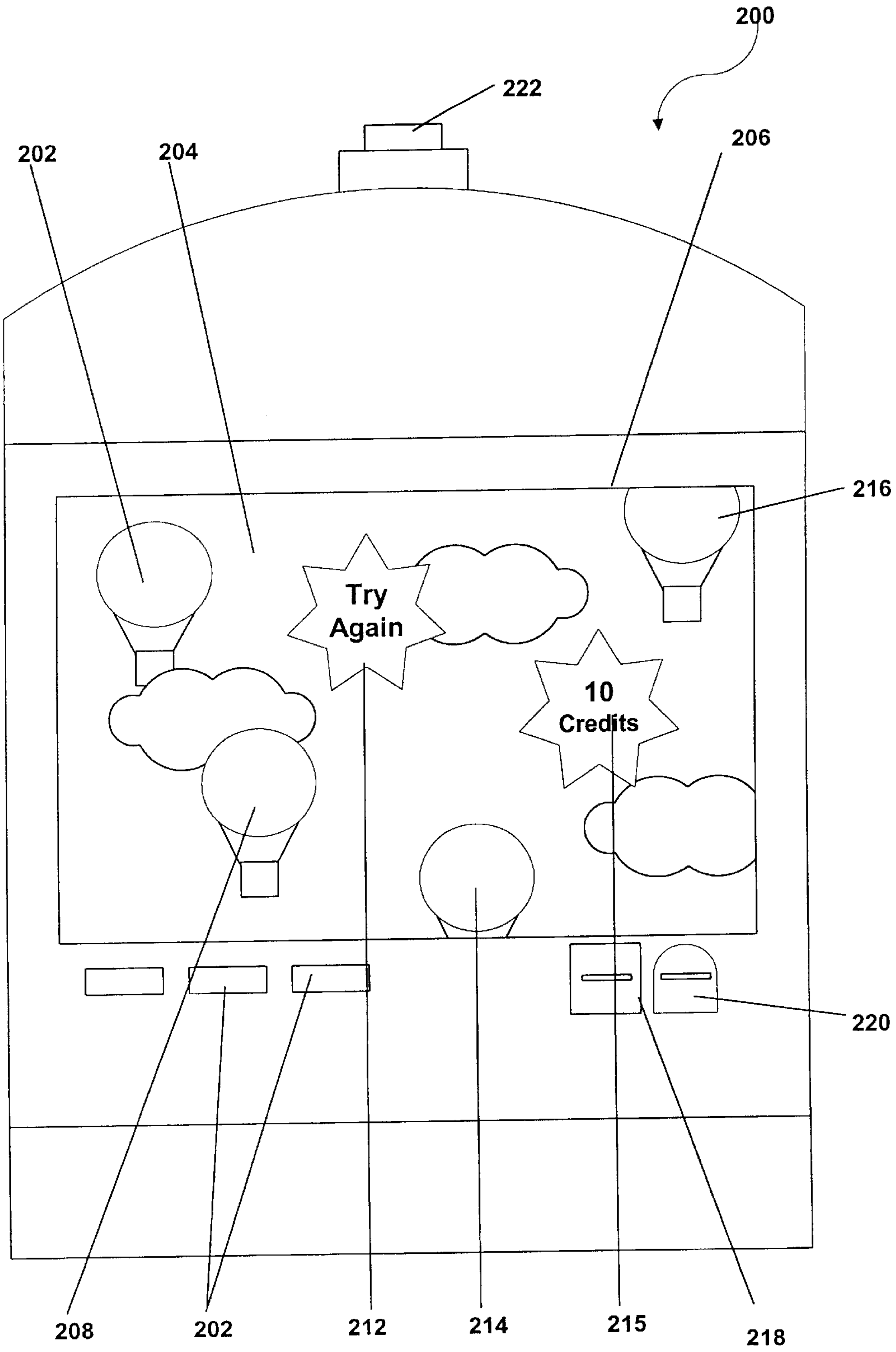
FIG. 2 is a block diagram depicting an example of a parallel balloon game being played on a video gaming machine.

FIG. 2 is a block diagram depicting an example of a parallel balloon game being played on a video gaming machine. The game might be implemented on a gaming machine with a touch video display screen 206, input switches 209, a bill validator 218, and a coin acceptor 220 as well as many other associated gaming devices (not shown) that provide various game features such as visual and sound effects. In this example, balloons float across the display screen moving from the bottom of the display screen 206 to the top of the display screen 206. On the display screen 206, each balloon represents a game on the gaming machine. A game background 204 is displayed with the balloons. The background might include clouds, a background color, airplanes, birds and any other visual effects which add to the excitement of the game.

After a player has deposited money or indicia of credit in the bill validator or coin acceptor, a player might initiate the following steps as part of a single game sequence 1) making a wager and 2) selecting a balloon for a game play and 3) initiating a game play. In one embodiment, each balloon on the touch display screen 206 may require a certain wager amount to be selected for game play. Thus, the player may place a wager by selecting a balloon and then initiate the game play using the game inputs 209 or the touch display screen 206. For each balloon, the wager amount may be represented in any manner that allows a player to determine the wager amount from the game presentation of the balloon. For example, the wager amount may be represented by the color of the balloon or symbols displayed on the balloon. In another embodiment, using the game inputs 209, a player may be able to vary the amount of the wager on a particular balloon game. After a player has initiated a game play, the gaming machine 200 completes the game sequence by determining a game outcome and presenting the game outcome to the player on the display screen 206.

A game outcome might be determined using a random number generator and a pay table stored in a memory within the gaming machine 200. The pay table is list of game outcomes. Each game outcome is assigned a fixed probability of occurring. Thus, with the random number generator, an independent game outcome can be selected from the pay table by the master gaming controller for each game play initiated on the gaming machine 200. A number of different game outcomes may be stored in the pay table. Typically, game outcomes are either a loss of the wager on the game or an award of some type. At the end of a game outcome presentation, a loss of wager might be indicated by the "Try again" contained within the star for game "C" 212. An award might be indicated by the "10 credits" contained with the star for game "E." Many awards of different values are possible. Usually, the probability of an award for a particular game play decreases as the value of the award increases. Further, the maximum value of the award available for a winning game play may increase when the wager made for the game play is increased.

The game outcome presentation for a single game sequence may utilize both visual and audio effects. The presentation of these effects is controlled by the master gaming controller. A player may view some of the visual effects of the game outcome presentation on the display screen 206. Further, a player may view additional visual effects from the light 222, back-lit display panel and other display screens attached to the gaming machine and operated by the master gaming controller. A player may hear audio effects projected from speakers attached to the gaming machine. For example, a game outcome presentation for one of the balloon games on the display screen 206 might consist of a hole appearing in a balloon including, game "A" 202, game "B" 208, game "E" 214, or game "F" 216, and the balloon appearing to rapidly lose air and move around on the display screen 206. At the end of the game outcome presentation, the game outcome, including "Try again" for game "C" 212 or "10 credits" for game "E" 214, is displayed. The length of time of the game outcome presentation including the game outcome is variable but will typically last 3–5 seconds. The game outcome presentation on the display screen 206 might be accompanied by sound effects including air rapidly escaping from a balloon and additional visual effects including flashing or strobing lights. As another example, the game outcome presentation for an individual balloon game, including game "A" 202, game "B" 208, game "D" 214, or game "F" 216, might display a balloon appearing to catch fire and explode on the display screen 206. The presentation on the display screen 206 might be accompanied by sound effects including a pop or a bang. Again, at the end of the game outcome presentation, the game outcome is displayed.

For the different balloon games, many different game outcome presentations are possible and are not limited to the examples described above. Further, many different combinations of game outcome presentations are possible. For example, the game outcome presentation for each balloon might be randomly selected from a number of game outcome presentations stored on the gaming machine. Also, the number of the balloon games displayed on the display may be varied.

The game playing methodology in this invention allows a new game play to be initiated by a player before the game outcome presentation of a previous game has been completed. As describe above, a game sequence may consist of the following steps by the player and the gaming machine 1) make wager (player), 2) select game (player), 3) initiate game (player), 4) determine game outcome (gaming machine) and 5) present game outcome (gaming machine). Once a player has initiated a game, the player may proceed to make a new wager, select a balloon, and initiate a second game while the gaming machine is determining the game outcome and presenting the game outcome from the first game. The wager on the first game may be the same or different than the wager on the second game. However, the probability of the game outcomes for the first, second and all subsequent games are independent of one another. Thus, the probability of a particular game outcome for a game is not affected by the game outcomes of previous games.

For the balloon game, multiple game outcome presentations in different stages may appear on the display screen at the same time. The number of balloon game outcome presentations appearing on the display screen at a given time may depend on a number of variables including 1) the length of time of each balloon game outcome presentation, 2) the length of time a player uses to make a wager, to select a game and to initiate a game play and 3) in some cases the time required to input more money or indicia of credit into the gaming machine. For example, when a balloon game outcome presentation is 5 seconds long and a player initiates a new game every 0.5 seconds, up to 9 game outcome presentations in various stages may be presented on the display screen 206 at the same time. Thus, after being selected for a game play some balloons as described above, including game "A" 202, game "B" 208, game "D" 214 or game "F" 216, might appear to be losing air and moving all around the display screen 206 while other balloons might appear to be slowly catching fire and exploding. The game outcome presentations may appear to interact. For example, one balloon might appear to collide with another balloon and move it to another location or catch it on fire. However, although the multiple game outcome presentations may appear to interact the probability of the game outcome for each game is not affected by the game outcome presentation. Thus, the probability of each game outcome remains independent even when the game outcome presentations appear to interact on the display screen 206.

One advantage of this parallel game playing methodology is that the game throughput is not limited by the sequential presentation of the game outcome. The game throughput is the maximum number of games which may be played by a typical player on a gaming machine in a fixed period of time. For a parallel game played on a gaming machine, a game may be initiated as soon as a player has made a wager, and selected a game. Thus, for parallel game play, the number of games played in a fixed period time is limited by the time a player uses to initiate a new game and not by the presentation of the game outcome as is typically the case for sequential game play.

Another advantage of the parallel game playing methodology is that a player may be able to bet less per game and play many more games in a fixed period of time than when a sequential game playing methodology is used. This feature may add to the excitement of the game and lead to additional game play on the gaming machine. Further, since the game throughput may be significantly higher for a parallel game than for a sequential game. The profitability of the gaming machine, which is the product of the game throughput times the average of wager per game, may be higher for a parallel game played on a gaming machine than for a sequential game played on a gaming machine.

Figure 3:
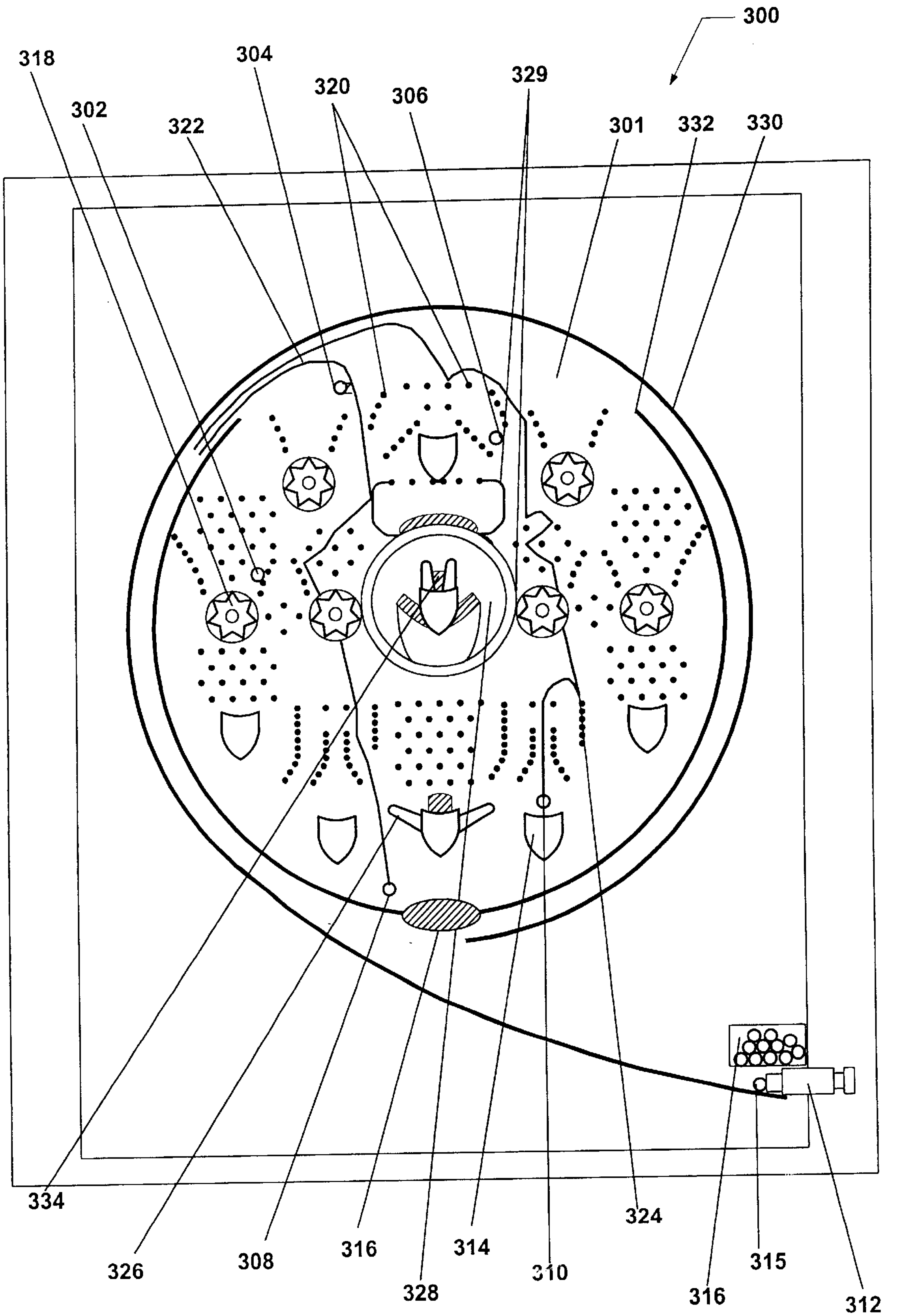
FIG. 3 is a block diagram depicting an example of a parallel pachinko game being played on a gaming machine.

FIG. 3 is a block diagram depicting an example of a parallel pachinko game being played on a gaming machine. A parallel pachinko game might be implemented on a gaming machine as described in FIG. 1 using the parallel game playing methodology described in FIG. 2. Aspects of a parallel pachinko game outcome presentations are shown on the video display screen 300. Similar to the balloon game described with reference to FIG. 2, a video pachinko game sequence may consist of the following steps by the player and the gaming machine 1) make wager (player), 2) select game (player), 3) initiate game (player), 4) determine game outcome (gaming machine) and 5) present game outcome (gaming machine). As describe with reference to FIG. 2, the gaming machine calculates a game outcome using a random number generator and a pay table stored within the gaming machine.

In some embodiments, steps 1, 2, and 3 by the player, as described above, may be combined. For example, a player may make a wager (step 1) by selecting a game for game play (step 2). As another example, a player may make a wager (step 1) and initiate a game (step 3) by selecting a game for game play (step 2).

A video pachinko game outcome presentation typically includes at least one ball including ball 315 entering a game playing area 301 and appearing to fall, as being drawn by gravity, through the game playing area 301 on the display screen 306. As the ball falls it may appear to collide with a number of objects which alters the trajectory of the ball 315 as it passes through the game playing area 301. At the end of the game, the ball appears to leave the game playing area 301 through one of a number of exits. The game outcome, determined by the gaming machine, corresponds to which exit the ball 315 leaves the game playing area 301. Depending on the game outcome, the player may win an award or lose the wager made on the game.

Typically, the video pachinko game outcome presentation on a video display screen 300 begins with a ball from the ball reservoir being placed on a ramp 317 in front of the plunger 312. The number of balls in the ball reservoir may correspond to the number of credits a player has on the gaming machine. The plunger 312 is drawn backward away from the ball 315 and then released. When the plunger 312 is released, it moves forward towards the ball 315 and appears to strike the ball 315. After being hit by the plunger 312, the ball 315 is launched up the ramp and into the game playing area 301.

In the game playing area 301, balls may appear to interact with different objects while falling through the game playing area 301 including pegs 320, an outer wall 330, an inner wall 332, flippers 326, bonus region separator 329, a cup 314, and a spinner 318. For example, when a ball appears to strike a peg, the trajectory of the ball is altered. Typically, a ball will appear to collide with many different combinations of objects before exiting the game playing area. The ball exit corresponds to a game outcome. For example, when a ball exits the game playing area 301 through the ball exit 316, a player loses the wager on the game. When a ball exits the game playing area 301 through one of the 7 cups including the cup 314 or the bonus region exit 334, the game outcome is an award of some type or a chance at another game (e.g. a bonus game).

Game "D" is an example of a losing game trajectory where the game outcome is a loss of the wager made on the game for a typical game outcome presentation. After entering the game playing area 301, the game "D" ball 308 appears to collide with a peg, the bonus region separator 329, a number of pegs, a spinner, a number of pegs, and a flipper 326 along the game "D" trajectory 322. After each collision, the trajectory of the ball appears to be altered. The game "D" ball 308 leaves the game playing area 301 through the ball exit 316 which corresponds to a loss of the wager on the game. The game "D" trajectory 322 is one example of the many different possible losing trajectory game outcome presentations that are possible.

Game "E" is an example of a winning game trajectory where the game outcome is an award, which may be based on the amount of the wager made on the, for a typical game outcome presentation. After entering the game playing area 301, the game "E" ball 310, appears to collide with a number of pegs, a spinner, and a number of pegs along the game "E" trajectory 324. The game "E" ball 310 leaves the game playing area 301 through the cup 314 which corresponds to an award of some type. The amount of the award may be indicated by displaying a message of some type to the display screen and increasing the number of balls in the ball reservoir. The game "E" trajectory 324 is one example of the many different possible winning trajectory game outcome presentations that are possible.

As described with reference to FIG. 2, the parallel game playing methodology in this invention allows a new pachinko game play to be initiated by a player before the game outcome presentation of a previous pachinko game has been completed. Once a player has initiated a game, the player may proceed to make a new wager, select a pachinko game ball, and initiate a second game while the gaming machine is determining the game outcome and presenting the game outcome from the first game. The wager on the first game may be the same or different than the wager on the second game. However, the probability of the game outcomes for the first, second and all subsequent games are independent of one another. Thus, the probability of a particular game outcome for a game is not affected by the game outcomes of previous games.

For the video pachinko game, multiple game outcome presentations in different stages may appear on the display screen at the same time. As described with Reference to FIG. 2, the number of pachinko ball game outcome presentations appearing on the display screen at a given time may depend on a number of variables including 1) the length of time of each game outcome presentation, 2) the length of time a player uses to make a wager, to select a game and to initiate a game play and 3) in some cases the time required to input more money or indicia of credit into the gaming machine. Thus, many balls, including game "A" 302, game "B" 304, game "C", game "D" 308, game "E" 310, or game "F" 316, might appear to falling through the game playing area 301 at the same time. Typically, each ball will collide with a number objects along its trajectory before exiting the game playing area 301. Further, the game outcome presentations may appear to interact. For example, one ball might appear to collide with another ball altering the trajectories of each of ball. However, although the multiple game outcome presentations may appear to interact the probability of the game outcome for each game is not affected by the game outcome presentation. Thus, the probability of each game outcome remains independent even when the game outcome presentations appear to interact on the display screen 300.

In another embodiment, two or more video pachinko game outcomes may be determined and presented simultaneously during a single pachinko game sequence. For example, a video pachinko game sequence may consist of the following steps, 1) make wager (player), 2) select two or more games (player), 3) initiate the two or more games (player) with a single input signal, 4) determine the game outcomes for the two or more games (gaming machine) and 5) present simultaneously the game outcomes for the two or more games (gaming machine). The wager for each game in the game sequence may be divided by the number of games initiated by the player or may be selected independently for each game. For example, when a player initiates 5 games in a game sequence, the wager on each game may be the total wager divided by 5 or the wager for each game may be different for each game. As described above, the probability of each game outcome remains independent even when the game outcome presentations appear to interact on the display screen 300. This embodiment may be applied to any parallel game that allows the simultaneous display of multiple game outcome presentations and is not limited to video pachinko.

Figure 4:
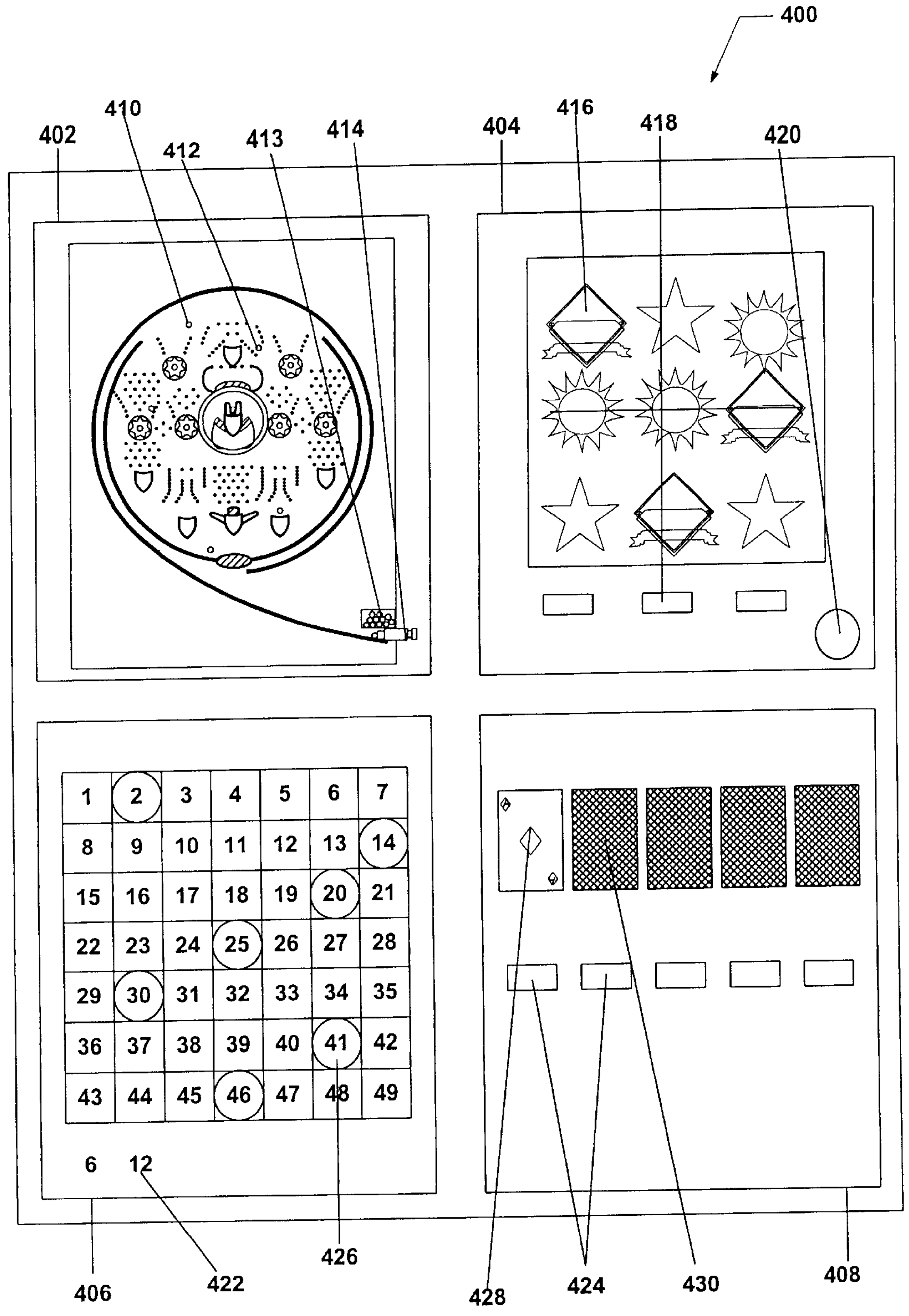
FIG. 4 is a block diagram depicting a gaming machine display screen with multiple game outcome presentations for a video pachinko game, a slot game, a keno game, and a card game.
Figure 5A:
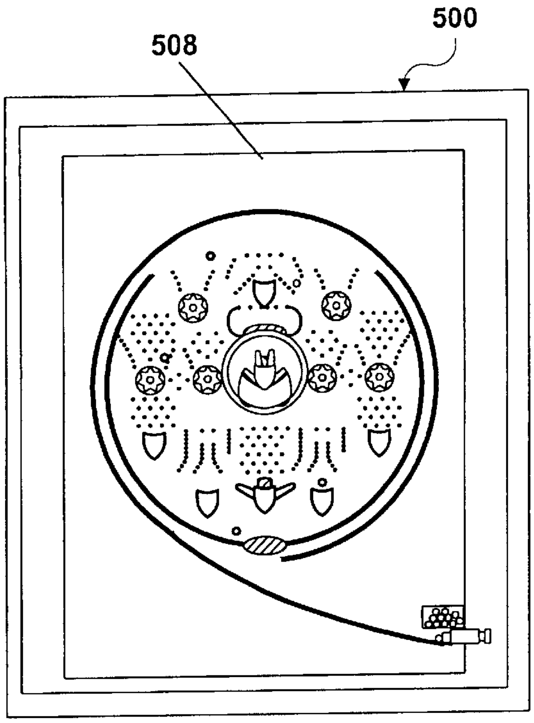
FIGS. 5A, 5B, 5C, and 5D are block diagrams of gaming machine display screens depicting a multiple game play sequence.
Figure 5B:
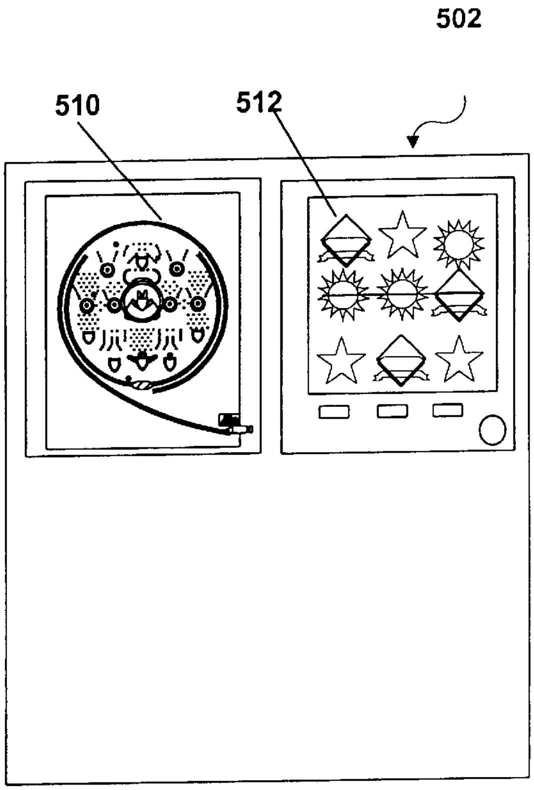
Figure 5C:
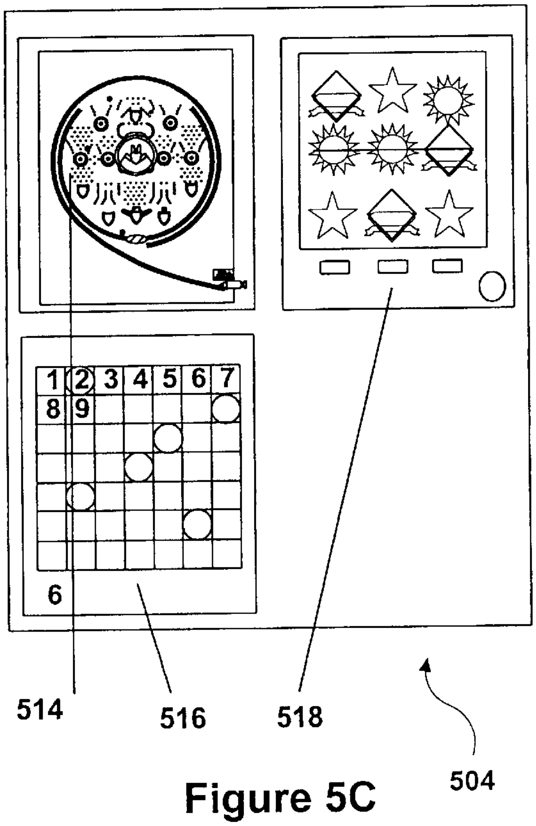
Figure 5D:
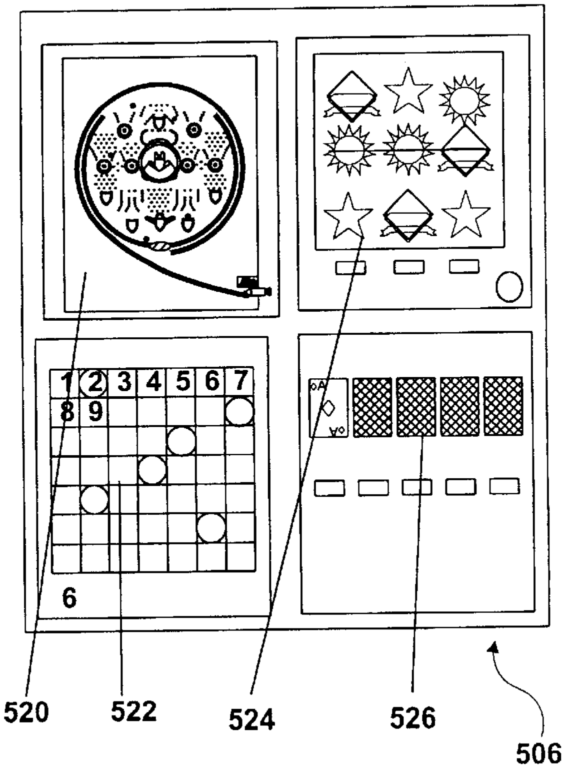

FIG. 4 is a block diagram depicting a gaming machine display screen with multiple game outcome presentation for a video pachinko game, a slot game, a keno game, and a card game. The pachinko game 402, the slot game 404, the keno game 406, and the poker game 408 are each presented using about 25% of the display screen 400. Using the parallel game methodology, a player may simultaneously play combinations of games with parallel or sequential game outcome presentations. For example, in one embodiment, the pachinko game 402 allows for a parallel game outcome presentation while the slot game 404, the keno game 406, and the poker game 408 require sequential game outcome presentations. The pachinko game 402 may be a parallel game because it is possible to display simultaneously the outcomes from multiple games. For example, the game outcome presentations for game "A" 410 and Game "B" 412 are displayed simultaneously for the pachinko game 402. In one embodiment, the slot game 404, the keno game 406 and the poker game 408 are sequential games because only one game outcome is displayed at a time for each game. Thus, the game outcome presentation for the slot game 404 is completed before the player is able to initiate a subsequent slot game. Similarly, the game outcome presentations for the keno game 406 or the poker game 408 are each completed before the player is able to initiate a subsequent keno game 406 or a subsequent poker game 408.

In one embodiment, the combination of the pachinko game 402, the slot game 404, the keno game 406, and the poker game 408 may represent a parallel game playing methodology because the game sequences for each game being played on the gaming machine are independent of one another. Thus, a player can initiate different games with overlapping game outcome presentations. For example, after initiating a slot game 404 and while the slot game outcome is being presented, a player may make game decisions for the keno game 406, the poker game 408 or the pachinko game 402 or initiate new keno games 406, poker games 408 or pachinko games 402. As another example, while a number of pachinko game outcomes are being presented for the pachinko game 402, a player may initiate new games, including slot games 404, keno games 406 or poker games 408, or make game discussions for the slot game 404, the keno game 406 or the poker game 408.

The number and type of game outcomes being presented on the display screen 400 at a particular time may depend on when each game was initiated, the types of games being played, and the rate at which a player is initiating new games or making game decisions. For example, while the keno outcome 422 is being presented, a player may focus his or her attention on the keno game 406 and stop game playing on the pachinko game 402, the slot game 404, or the poker game 408. As another example, while a player is making decisions about the poker game elements, 428 and 430, a player may stop game playing on the slot game 404, pachinko game 402 or the keno game 406.

Within the gaming machine, the master gaming controller coordinates the multiple game outcome presentations on the display screen in response to the player inputs. Further, for each game on the gaming machine, the master gaming controller may access a pay table corresponding to that game to calculate the game outcome. The pay table contains a list of all possible game outcomes and the probability of each game outcome occurring. Thus, for example, the master gaming controller may utilize one pay table to determine game outcomes for the pachinko game 402 and another pay table to determine game outcomes for the slot game 404.

With the invention, many different combinations of parallel game play are possible and are not limited to the types and combinations of games in FIG. 4. For example, a player might play four sequential games of the same type at the same time, including four slot games, four keno games or four video poker games. As another example, a player might play four sequential games of different types at the same time including two slot games and two video poker games or one keno game and three slot games. For each combination of games, the game sequences for each game are independent of one another. Thus, for each of the four games, a player may initiate a new game once the game outcome of a subsequent game has been completed but independently of the status of the game outcome presentations of the other three games. For example, while playing four video poker games simultaneously on a display screen divided into four regions, a player may initiate a new video poker game in the same display region where the game outcome presentation of a previous game has been completed. However, before initiating the new game, a player may make game decisions or complete game play on the other video poker games in the other three regions of the display screen.

For each game, a player may make game decisions or initiate new games using the video display screen as a touch screen or other gaming inputs on the gaming machine. For example, a player may initiate new pachinko games by touching a ball in the ball reservoir 413 and touching the plunger 414. As another example, a player may make wagers and initiate a new slot game 404 using the game inputs, 418 or 420. After a slot game has been initiated, the slot game elements 416 will usually change on the display screen. Further, a player may make a keno game selection 426 by touching the display screen 400 at each number or may make poker game decisions using the poker game inputs 424 on the display screen 400.

FIGS. 5A, 5B, 5C, and 5D are block diagrams of gaming machine display screens depicting a multiple game play sequence. In one embodiment, FIGS. 5A, 5B, 5C, and 5D represent a sequence of game play by a player on the gaming machine where each figure is the display screen on the gaming machine at a different time. The sequence of game play for each of the pictures may be in any order. For example, a player may begin game play on the gaming machine by initiating a pachinko game "A1" 508. As described with reference to FIG. 3, the pachinko game is a parallel game. Thus, multiple game outcomes may be presented at one time. The pachinko game "A1" 508 on the display screen 500 is the pachinko game outcome presentation at a time t1.

At some time later than t1, a player may initiate a second game on the gaming machine while still playing the video pachinko game. Thus, a player may initiate a slot game "B2" 512 while still playing a pachinko game "B1" 5 10. At a time t2 which is later than t1, the pachinko game "B1" presentation and the slot game "B2" presentation are displayed on the display screen "B" 502 at the same time. While playing the slot game "B2" 512 and the pachinko game "B1" 510, player may alternate his or her attention in any order between the pachinko game "B1" and the slot game "B2". Thus, the player may make game decisions, initiate new games or make wagers using the gaming machine inputs for each game. Further, the game outcome presentations and game outcomes for the slot game "B2" 512 and the pachinko game "B1" 510 are independent of another as described in reference to FIG. 4. Therefore, game play on one game does not affect the game outcome presentation or game outcome for the other game.

At some time later than t2, a player may initiate a third game on the gaming machine while still playing the video pachinko game and the slot game. Thus, a player may initiate a keno game "C2" 516 while still playing a pachinko game "C1" 514 and a slot game "C3" 518. At a time t3 which is later than t1 and t2, the pachinko game "C1" presentation, the slot game outcome presentation and the keno game outcome presentation are displayed on the display screen "C" 504 at the same time. While playing the slot game "C3" 518, the keno game "C2" 516 and the pachinko game "C1" 514, a player may alternate his or her attention in any order between the pachinko game "C1" 514, the keno game "C2" 516 and the slot game "C3" 518.

At some time later than t3, a player may initiate a fourth game on the gaming machine while still playing the video pachinko game, the keno game and the slot game. Thus, a player may initiate a video poker game "D4" 526 while still playing a pachinko game "D1" 520, a keno game "D2" 522 and a slot game "D3" 524. At a time t4 which is later than t1, t2, and t3, the pachinko game "D1" presentation, the slot game outcome presentation, the keno game outcome presentation and the video poker presentation are displayed on the display screen "D" 506 at the same time. While playing the video poker game "D4" 526, the slot game "D3" 524, the keno game "D2" 522 and the pachinko game "D1" 520, a player may alternate his or her attention in any order between the pachinko game "D1" 520, the keno game "D2" 522, the slot game "D3" 524 and the video poker game "D4" 526. Within the gaming machine, the master gaming controller coordinates the multiple game outcome presentations on the display screen in response to the player inputs.

As another example, at a time t1, a player may be playing the pachinko game "C1" 514, the keno game "C2" 516, and the slot game "C3" 518 on the display screen "C" 504. The player may decide to play an additional game. Thus, at a time t2 which is later than t1, a player may be playing the pachinko game "D1" 520, the keno game "D2" 522, the slot game "D3" 524, the video poker game "D4" 526 on the display screen "D" 506. Next, a player may decide to play only one game. Thus, at a time t3 which is later than t1 and t2, a player may play only the pachinko game "A1" on the display screen "A" 500. Then, the player may again decide to play an additional game. Thus, at a time t4 which is later than t1, t2, and t3, a player may decide to play the video pachinko game "B1" 510 and the slot game "B2" 512 on the display screen "B" 502.

In another embodiment FIGS. 5A, 5B, 5C and 5D represent different combinations of game play on a gaming machine providing the parallel game methodology. For example, in a game play on the gaming machine, a player may play the single video pachinko game "A1" 508 and then stop without initiating additional games. As another example, a player may simultaneously play the video pachinko game "B1" 510 and the slot game "B2" 512 during a game play and then stop without initiating additional games. Further, a player may simultaneously play the video pachinko game "C1" 514, the keno game "C2" 516 and the slot game "C3" 518 during a game play and then stop without initiating additional games.

Figure 6A:
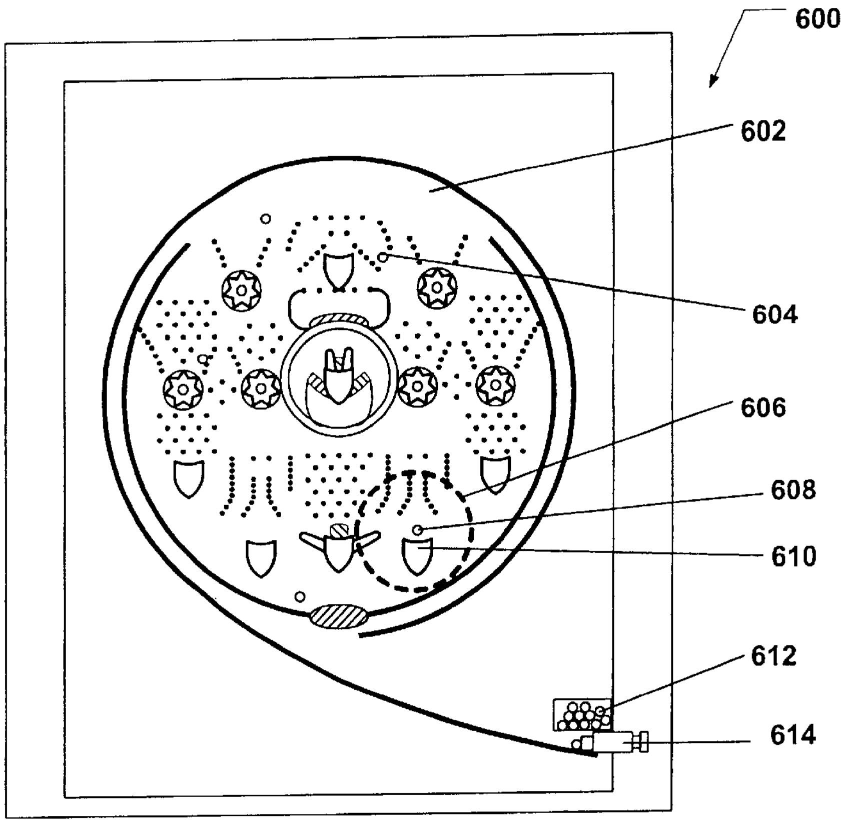
FIGS. 6A and 6B are block diagrams of gaming machine display screens depicting a parallel video pachinko game with a bonus game option.
Figure 6B:
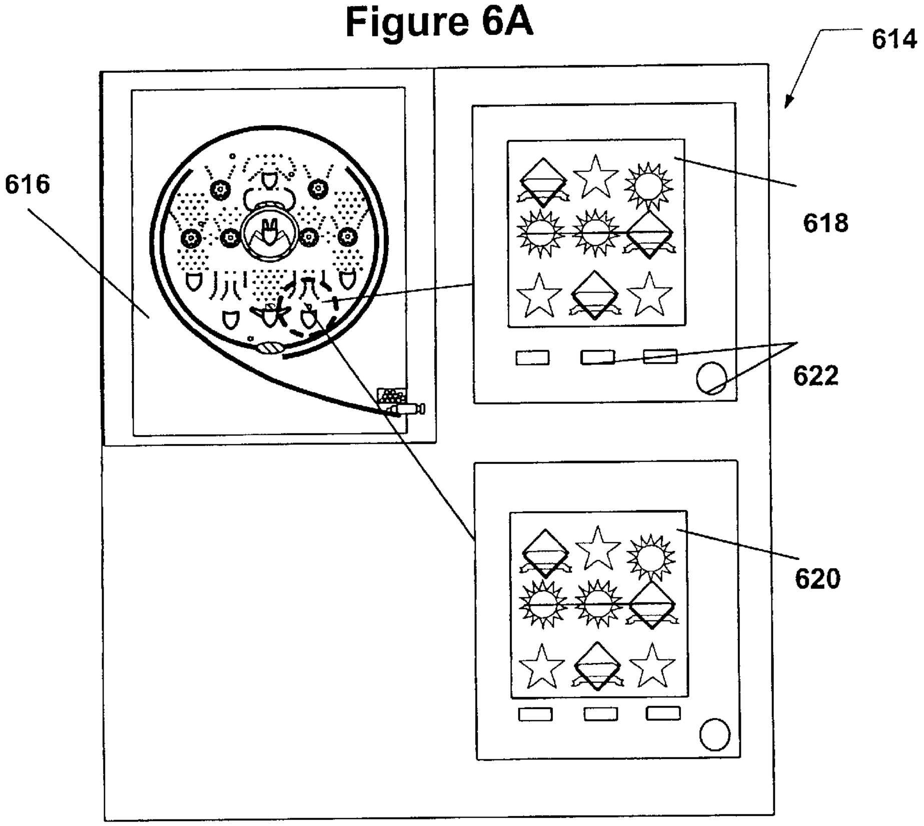

FIGS. 6A and 6B are block diagrams of gaming machine display screens depicting a parallel video pachinko game with a bonus game option. As described with reference to FIG. 3, a video pachinko game may be initiated when a player selects a ball from the ball reservoir 612 on the game display 600. Then, the gaming machine determines a game outcome and the game outcome is presented to the player on the display screen 600. The game outcome presentation begins with a ball being propelled by the plunger 614 into the game playing area 602. With the video pachinko game, multiple game outcomes may be presented simultaneously. For example, the outcomes of a game "A" 604 and a game "B" 606 are shown on the display screen 600. When a ball enters one of the seven cups including 610, the player typically receives an award of some type. The amount of the award is usually variable and is based on a pay table stored within the gaming machine.

In one embodiment of this invention, the presentation of an award may be made via a bonus game. For example, during a pachinko game, a cup 610 may be identified as a bonus area by a delimiter of some type including the dashed circle 606. When a ball including game "B" 608 enters a cup 610 within a bonus game area 600, one or more bonus games may be presented to the player. The outcome of the bonus game corresponds to a predetermined award by the gaming machine for game "B" 608and is an additional game outcome presentation for game "B" 608.

In another embodiment of this invention, when the ball including game "B" 608 enters the cup 610 within the bonus game area 600, the player may be provided an additional game play opportunity. The additional game play opportunity may be a different game with a game outcome and a game outcome presentation independent from the first game.

For example, after a ball enters the cup 610 in the bonus game area 600, a player may be presented an award and then a slot game may appear on the display screen. A player may be offered the opportunity to bet all or a portion of the award on the slot game. When a player makes a wager and initiates the slot game, the gaming machine determines a game outcome for the slot game and presents the game outcome to the player on the display screen.

In FIG. 6B, a video pachinko game outcome presentation 616 with a bonus slot game "A" presentation 618 and a bonus slot game "B" 620 presentation on the game display 614 is shown. The bonus games, 618 and 620, may be initiated when a ball enters a cup 610 in the bonus game area 606. With the parallel game playing methodology, a player may continue to play the game that triggered the bonus game while the one or more bonus games are presented. For example, a player may continue to play the video pachinko game 616 while the outcomes of the bonus slot game "A" 618 and the bonus slot game "B" 620 are presented. Further, a player may make additional game decisions on the bonus game while the game that spawned the bonus game is being presented. For example, while the video pachinko game 616 is being presented, a player may make an additional wager and initiate a slot game "A" presentation 618 using the slot game player inputs 622. The combinations of the video pachinko game and the slot game are only one embodiment of the present invention. Many different games with various bonus games presentations are possible.

Figure 7:
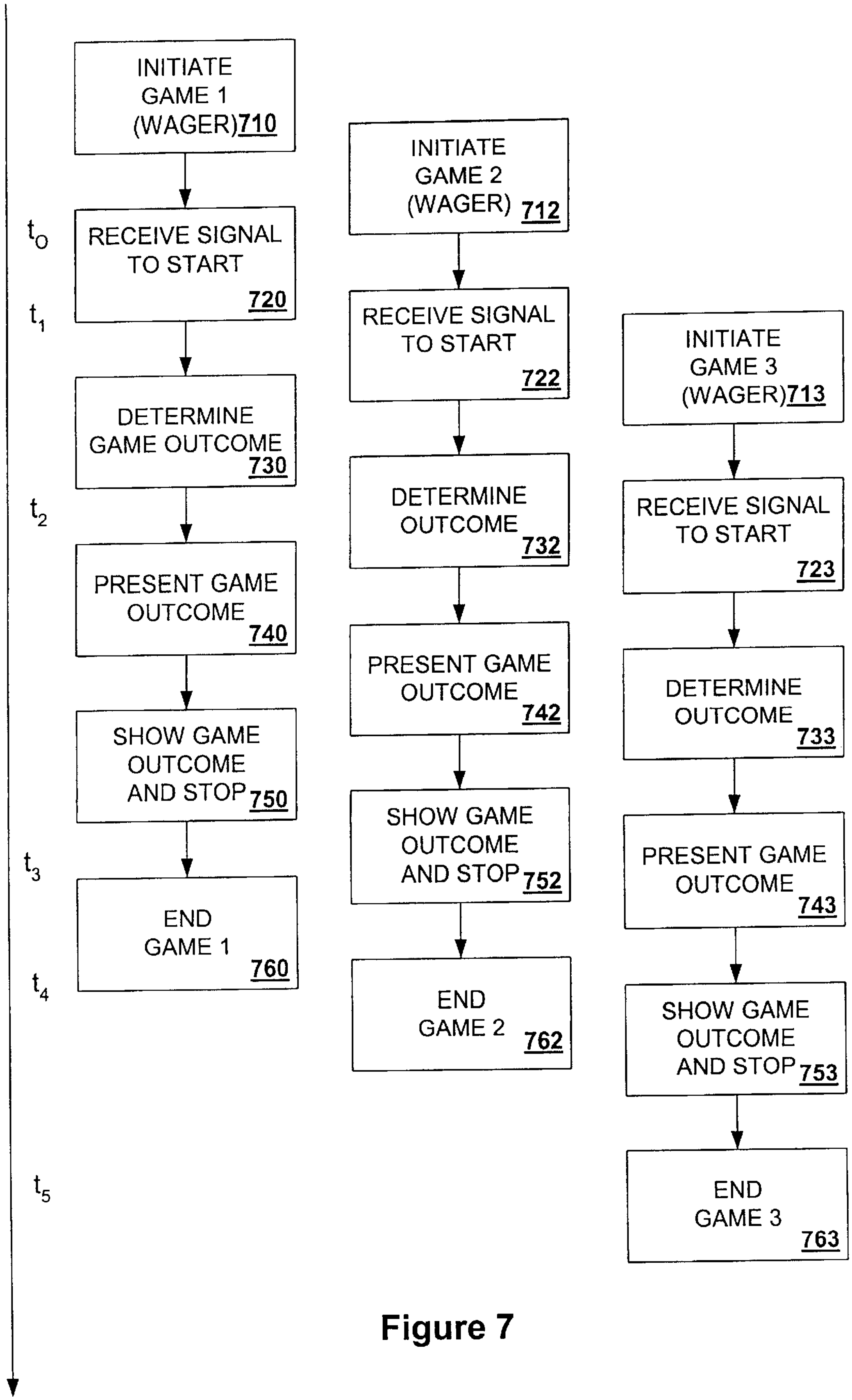
FIG. 7 is a flow chart depicting a parallel game playing methodology on a gaming machine.

FIG. 7 is a flow chart depicting a parallel game playing methodology on a gaming machine. In the flow chart, a timeline of game play is shown for three different games being played on a single gaming machine. In steps 710, 712, and 713, a player initiates game play on the gaming machine by making a wager. Each video game may be selected from the group including slot games, poker games, keno games, pachinko games or balloon games. As described with reference to FIGS. 2 and 3, a game outcome presentation on the gaming machine is initiated after a player makes a wager and then the player activates an input device on the gaming machine.

In steps 720, 722, and 723, the game play is activated on the gaming machine after receiving a start signal from an input device on the gaming machine. The input signals are received by the gaming machine at different times. The start signal for game 1 is received at t1, the start signal for game 2 is received at t2, and the start signal for game 3 is received at t3 where t3 is after t1 and t2 and t2 is after t1. The difference in time between t1 and t2 or t2 and t3 depends on the length of time used by the player to initiate each game.

In steps 730, 732, and 733, the master gaming controller on the gaming machine determines a game outcome for each game. The outcome for each game is determined independently for each game. Thus, the outcome of one game does not affect the outcome of another game. In steps, 740, 742, and 743, the game outcome is presented to the player. The type of game outcome presentation will vary depending on the games available for play on the gaming machine. Further, the game outcome presentations may overlap. Thus, a player may view the game outcomes from multiple games at the same time. In steps 750, 762, 753, the game outcome is displayed for each game and the game is stopped. The game outcome, which is the end of the game outcome presentation, is usually a message displayed on some manner on the gaming machine indicating an award of some type or a loss of the wager made on the game.

In steps, 760, 762, and 763, each of the three games is ended. The end of game 1 is at time t3, the end of game 2 is at time t4, and the end of game three is at time t5 where t4 is after t3 and t5 is after t3 and t4. The end times for each game are not limited to the sequence in the figure. For example, game 3 may end before game 2 and game 1 although game 1 and game 2 are initiated before game 3. As another example, game 2 may end before game 1 and game 3. The end time for each game depends on the length of the game outcome presentation of each game and the time a player may use to make any needed game decisions for the game. Thus, in a sequence of games being played in parallel on the gaming machine, the length of time between the start of the game and the end of the game may vary from game to game.

Figure 8:
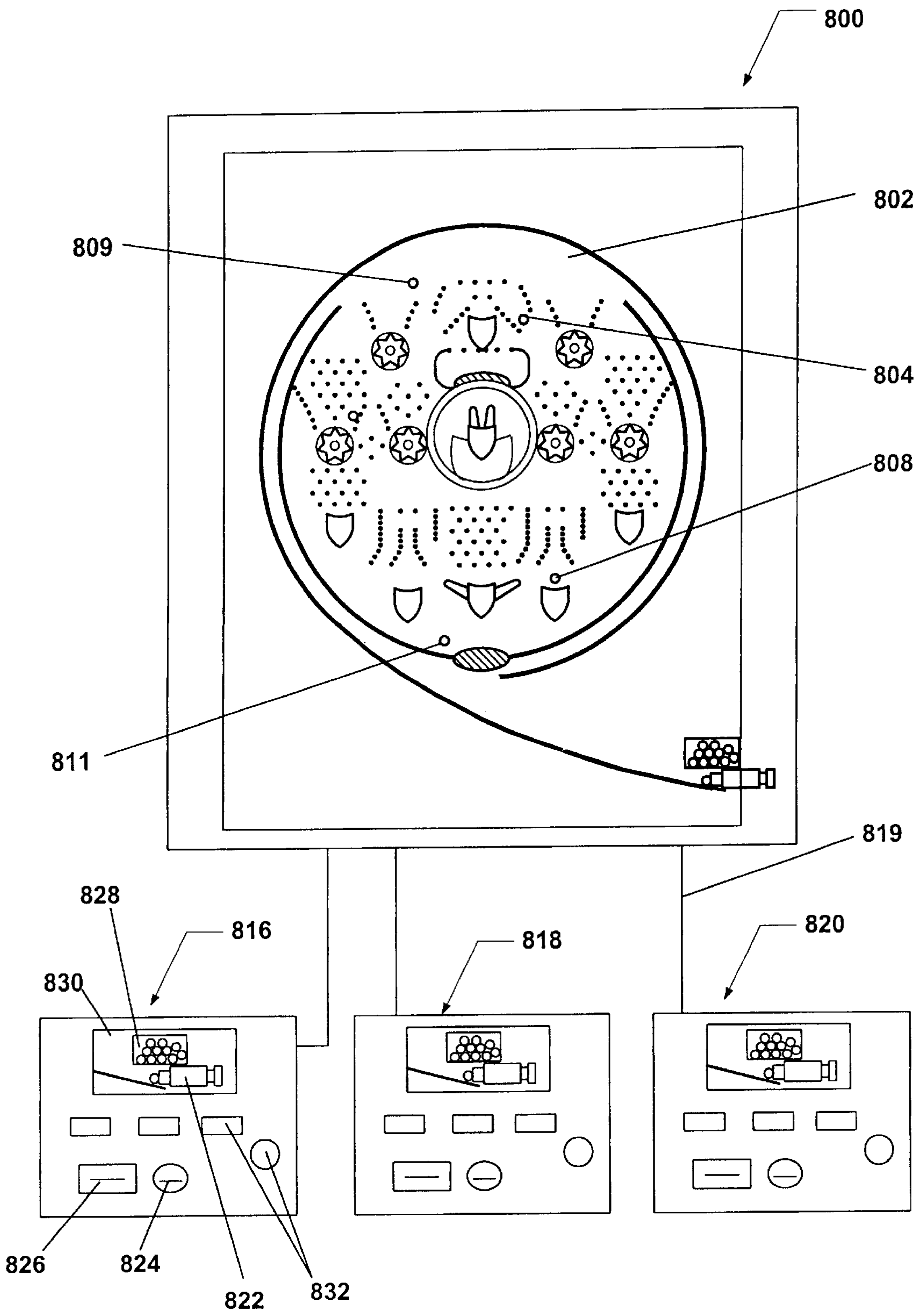
FIG. 8 is a block diagram depicting parallel game play by multiple players on a shared display screen.

FIG. 8 is a block diagram depicting parallel game play by multiple players on a shared display screen. Three player input panels 816, 818, 820 are shown which may allow up to 3 players to play a video pachinko game or some other parallel game simultaneously on a shared display screen 800. However, the number of players, which may share game play, is not limited to 3 players. Each player input panel is connected to the shared display screen 800 through a connection system 819 of some type. For example, the connection system may be a fiber optic connection system or a wireless connection system. Using the input panel 816, a player may insert money or credit of indicia using the bill validator 826 and coin acceptor 824. As described with reference to FIG. 3, a player may make a wager and initiate a game using the ball resevoir 828 and plunger 822 on display screen 830. The input panel may be mounted to a gaming machine or a separate device.

Using the input panels 816, 818 and 820, 3 players may make wagers and initiate pachinko game play. The game outcome presentations for each player are displayed on the shared game display 800 in the pachinko game playing area 802. For example, player 1 may initiate game A 804 and then game D 811 from input panel 816, player 2 may initiate game B 808 from input panel 818 and player 3 may initiate game C 809 from input panel 820. Each player may initiate another game before the game outcome presentations of the game or games that they have initiated by other players have are complete. Games 804, 808, 809 and 811 are simultaneously displayed on the shared display screen 800. The wagers for games 804, 808, 809 and 811 may be the same or different. Although the game outcome presentations for each game may appear to interact, the game outcomes for each game are calculated independently as previously described.

The shared display 800 is located in a manner that allows each player to see the game outcome presentation for their games. Additionally, the games initiated by each player may be represented in a manner that allows each player to distinguish their games from another player's games. For example, on the display 800, games 802 and 811 initiated by player 1 may be red, game 804 initiated by player 2 may be green and game 809 initiated by player 3 may be purple.

In another the embodiment, game outcome presentations initiated by one player may be simultaneously displayed on another gaming machine. For example, when a player initiates a first game on a first gaming machine, the game outcome presentation is simultaneously displayed on one or more gaming machines different from the gaming machine on which the first game was initiated. Thus, for groups of gaming machines connected in this manner, all the game outcome presentations initiated by multiple players playing games on different gaming machines may be viewed by each player on their gaming machine. For example, when the player input panel 816 is on a first gaming machine, the player input panel 818 is on a second gaming machine, and the player input panel 820 is on a third game machine, the game outcome presentations initiated from each input panel may be combined. The combined display of all the game outcome game presentations may be duplicated and displayed on a display device on each gaming machine. For example, each of the three gaming machines might display the combined game outcome presentation shown on the shared game display 800.

The simultaneous game play by multiple players on one or more gaming machines may be included as part of group bonus game play. For example, when the sum of the wagers from 3 players initiating games from the player input panels 816, 818 and 820 is above a certain amount, a bonus game shared by each player may be triggered. As another example, when the total number of balls on the shared display screen 800 is above a certain amount, a bonus game shared by each player may be triggered.

Although the foregoing invention has been described in some detail for purposes of clarity of understanding, it will be apparent that certain changes and modifications may be practiced within the scope of the appended claims. For instance, while the gaming machines of this invention have been depicted as having a display screen physically viewed through a vertical glass panel attached to a main gaming machine cabinet, the use of gaming devices in accordance with this invention is not so limited. For example, the display screen features may be provided on a table top gaming machine where the display screen is viewed through a horizontal glass panel.

What is claimed is:

1. A gaming machine comprising:

a housing;

a master gaming controller mounted within the housing designed or configured to determine game outcomes and to control the game outcome presentations for one or more games of chance in a manner allowing parallel game play of two or more separate game sequences each of the game sequences comprising:

i) receiving a wager wherein for each wager an input signal is generated for indicating that the wager has been made and for indicating an amount of the wager, ii) determining the game outcome for the game of chance using a paytable and a random number generator stored on the gaming machine, iii) presenting the game outcome presentation and the determined game outcome for the game of chance on a display screen;

the display screen coupled to the housing that is capable of simultaneously displaying the game outcome presentations generated for the two or more separate game sequences;

at least one input mechanism for receiving an input used by a player to make the wager and for each wager generating the input signal for indicating that the wager has been made and for indicating the amount of the wager;

wherein after a fire input of a first wager has been received by the input mechanism for a first game of chance in a first game sequence and prior to the completion of presenting the game outcome for the first game of chance the gaming machine is operable: i) to receive a second input of a second wager for a second game of chance in a second game sequence and ii) to begin generating the second game sequence.

2. The gang machine of claim 1, wherein the first game sequence is initiated on the gaming machine and the second game sequence is initiated on a second gaming machine wherein the game outcome presentation from said first game sequence is presented simultaneously with the game outcome presentation of said second game sequence.

3. The gaming machine of claim 1, wherein the game outcome presentations from the first and second games sequences are presented on at least one of 1) a shared display screen receiving signals from at least the gaming machine and the second gaming machine, 2) the display screen of the gaming machine, 3) the display screen of the second gaming machine and 4) combinations thereof.

4. The gaming machine of claim 3, wherein the first game outcome presentation appears to interact with the second game outcome presentation on at least one of the display screens.

5. The gaming machine of claim 2, wherein at least one of a game event in said first game sequence, a game event in said second game sequence and combinations thereof trigger a bonus game on at least one of the gaming machine, the second gaming machine and combinations thereof.

6. The gaming machine of claim 1, wherein one or more game outcome presentations for one or more game sequences from the gaming machine are displayed on the display screen of a second gaming machine.

7. The gaming machine of claim 6, wherein a game outcome presentation from a game sequence on said second gaming machine is simultaneously displayed with the game outcome presentation from the gaming machine on the display screen of the second gaming machine.

8. The gaming machine of claim 1, wherein the game outcome of each game of chance is not related to the game outcome of any other game of chance.

9. The gaming machine of claim 1, wherein the display screen is selected from the group consisting of a video display screen, a video touch screen and LCD screen.

10. The gaming machine of claim 1, wherein the first game of chance played in the first game sequence is selected from the group consisting of balloons, pachinko, slot, keno, or poker and a second game of chance played in a second game sequence is selected from the group consisting of balloons, pachinko, slot, keno, or poker.

11. The gaming machine of claim 1, wherein the first game of chance and the second game of chance are the same.

12. The gaming machine of claim 1, wherein at least one of the first game of chance and the second game of chance is pachinko.

13. The gaming machine of claim 1, wherein a third game of chance played in a third game sequence is selected from the group consisting of balloons, pachinko, slot, keno, or poker.

14. The gaming machine of claim 1, wherein the game outcome is determined by the master gaming controller from a pay table.

15. The gaming machine of claim 1, wherein a first game outcome for a game of chance played in a first game sequence is determined by the master gaming controller from a first pay table and a second game outcome for a game of chance played in a second game sequence is determined by the master gaming controller from a second pay table.

16. The gaming machine of claim 1, wherein the game outcome presentation includes a bonus game.

17. The gaming machine of claim 1, wherein a first game outcome presentation and a second game outcome presentation appear to interact on the display screen.

18. A method for generating parallel games on a gaming machine comprising: a) a housing, b) a master gaming controller mounted within the housing designed or configured to generate parallel game play of two or more separate game sequences, c) a display screen coupled to the housing that for displaying game outcome presentations generated for two or more different game sequences, d) an input mechanism coupled to the housing for inputting a wager amount, the method comprising:

receiving on the input mechanism a first input for specifying a first wager amount for a first game of chance played in a first game sequence;

generating a first input signal for indicating that the first wager has been made and for indicating the first wager amount;

determining a game outcome for said first game of chance using a first paytable and a random number generator stored on the gaming machine;

generating the game outcome presentation for the first game of chance;

presenting the game outcome presentation and the determined game outcome for said first game of chance on the display screen;

after receiving the first input and prior to a completion of presenting the determined game outcome for the first game of chance receiving on the input mechanism a second input specifying a second wager amount for a second game of chance played in a second game sequence;

generating a second input signal for indicating that the second wager has been made and for indicating the second wager amount;

generating the game outcome presentation for the second game of chance;

determining a game outcome for said second game of chance using a second paytable and the random number generator stored on the gaming machine; and presenting the game outcome presentation and the determined game outcome for said second game of chance on the display screen.

19. The method of claim 18, wherein the game outcome of said second game of chance is determined while presenting the game outcome for said first game of chance.

20. The method of claim 18, further comprising:

receiving a first input signal to initiate the first game of chance, receiving on a second gaming machine a second input signal to initiate the second game of chance; and presenting simultaneously the game outcome for the first game of chance and the game outcome presentation for the second game of chance.

21. The method of claim 20, wherein the game outcome presentations from the first and second games of chance are presented simultaneously on at least one of a shared display screen receiving signals from the gaming machine and the second gaming machine, the display screen of the gaming machine, the display screen of the second gaming machine and combinations thereof.

22. The method of claim 20, wherein the game outcome presentation for the first game of chance and the game outcome presentation for the second game of chance are simultaneously displayed on both the gaming machine and the second gaming machine.

23. The method of claim 18, wherein said first game of chance is selected from the group consisting of balloons, pachinko, slot, keno, and poker.

24. The method of claim 18, wherein said second game of chance is selected from the group consisting of balloons, pachinko, slot, keno, and poker.

25. The method of claim 18, wherein said first game of chance and said second game of chance are the same and selected from the group consisting of balloons, pachinko, slot, keno, and poker.

26. The method of claim 18, wherein the first wager made on said first game of chance is different from the second wager made on said second game of chance.

27. The method of claim 18, wherein the game outcome of said first game of chance is determined from a first pay table and the game outcome of said second game of chance is determined from a second pay table.

28. The method of claim 27, wherein the first pay table and the second pay table are the same.

29. The method of claim 18, further comprising presenting a bonus game associated with the first game of chance prior to the completion of the first game sequence.

30. The method of claim 29, further comprising receiving an input signal to start the bonus game, determining a bonus game outcome and presenting the bonus game outcome.

31. The method of claim 18, further comprising receiving an input signal to start a third game of chance played in a third game sequence prior to a completion of at least one of the first game sequence and the second game sequence, determining a game outcome for said third game of chance and presenting the game outcome for said third game of chance.

32. The method of claim 18, wherein at least the first game outcome presentation and the second game outcome presentation are simultaneously displayed.

33. The method of claim 18, wherein at least of one said first or said second games of chance is pachinko.

34. The method of claim 18, wherein objects in the first game outcome presentation and objects in the second game outcome presentation appear to interact.

35. A parallel game on a gaming machine comprising a) a housing, b) a master gaming controller mounted within the housing designed or configured to allow parallel game play of two or more separate game sequences, c) a display screen coupled to the housing for displaying game outcome presentations generated for two or more different game sequences, d) an input mechanism coupled to the housing for inputting a wager amount, the parallel game comprising;

a first game of chance that is separately initiated and presented on a first portion of the display screen generated as part of a first game sequence; and a second game of chance that is separately initiated and presented on a second portion of the display screen generated as part of a second game sequence wherein each game sequence comprises:

i) receiving a wager wherein for each wager an input signal is generated for indicating that the wager has been made and for indicating an amount of the wager, ii) determining the game outcome for the game of chance using a paytable and a random number generator stored on the gaming machine, iii) presenting the game outcome presentation and the determined game outcome for the game of chance on a portion of the display screen wherein after a first input of a first wager has been received by the input mechanism for the first game of chance in the first game sequence and prior to the completion of presenting the game outcome for the first game of chance on the first portion of the display, the parallel game is operable: a) to receive a second input of a second wager for the second game of chance in the second game sequence and b) to begin generating the second game sequence.

36. The parallel game of claim 35, wherein the said first game of chance and the said second game of chance are the same.

37. The parallel game of claim 35, wherein said first game of chance is selected from the group consisting of balloons, pachinko, slot, poker, and keno.

38. The parallel game of claim 35, wherein said second game of chance is selected from the group consisting of balloons, pachinko, slot, poker, and keno.

39. The parallel game of claim 35, wherein said first portion of the display screen and said second portion of the display screen are the same portion.

40. The parallel game of claim 39, wherein the first and second game are the same game and are selected from the group consisting of balloons and pachinko.

41. The parallel game of claim 35, wherein the display screen is selected from the group consisting of a video display screen, a video touch screen and a LCD screen.

42. A gaming machine comprising:

a housing;

a display screen coupled to the housing;

a master gaming controller mounted within the housing designed or configured to determine game outcomes and to control the game outcome presentation for a parallel game of chance, the parallel game, of chance comprising, a first game of chance that is separately initiated and presented on a first portion of the display screen generated as part of a first game sequence; and a second game of chance that is separately initiated and presented on a second portion of the display screen generated as part of a second game sequence wherein each game sequence comprises:

i) receiving a wager wherein for each wager an input signal is generated for indicating that the wager has been made and for indicating an amount of the wager, ii) determining the game outcome for the game of chance using a paytable and a random number generator stored on tie gaming machine, iii) presenting the game outcome presentation and the determined game outcome for the game of chance on a portion of the display screen;

at least one input mechanism for receiving an input used by a player to make the wager and for each wager generating the input signal for indicating that the wager has been made and for indicating the amount of the wager, wherein after a first input of a first wager has been received by the input mechanism for the first game of chance in the first game sequence and prior to the completion of presenting the game outcome for the first game of chance the gaming machine is operable: a) to receive a second input of a second wager for the second game of chance in the second game sequence and b) to begin generating the second game sequence.

* * * * *

UNITED STATES PATENT AND TRADEMARK OFFICE

CERTIFICATE OF CORRECTION

PATENT NO. : 6,656,040 B1

DATED : December 2, 2003

INVENTOR(S) : William R. Brosnan et al.

It is certified that error appears in the above-identified patent and that said Letters Patent is hereby corrected as shown below:

Column 17,
Line 60, change "fire" to -- first --.

Column 18,
Line 1, change "gang" to -- gaming --.

Column 20,
Lines 5 and 7, after "wager" add -- amount --.

Column 22,
Line 11, change "tie" to -- the --.

Signed and Sealed this

Sixth Day of July, 2004

JON W. DUDAS

*Acting Director of the United States Patent and Trademark Office*